United States Patent Office 3,262,353
Patented July 26, 1966

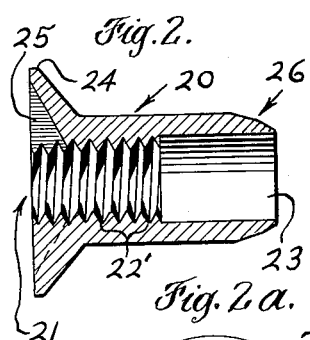
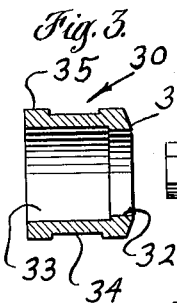
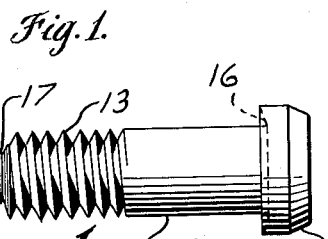
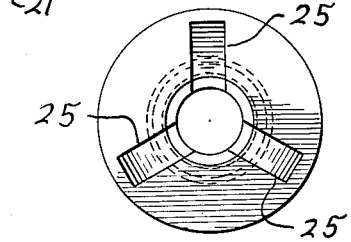
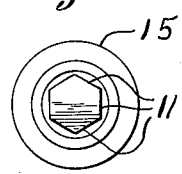
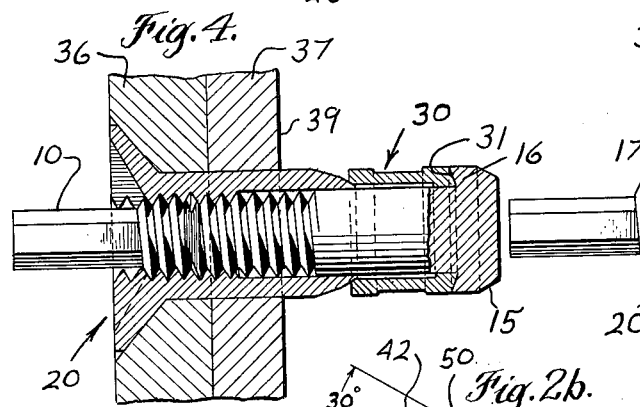
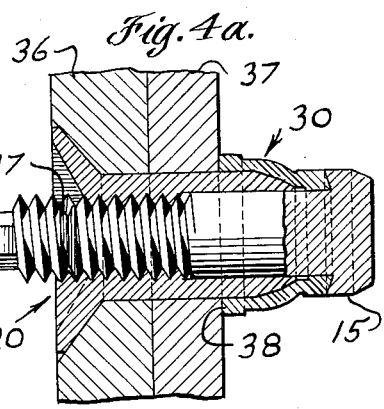
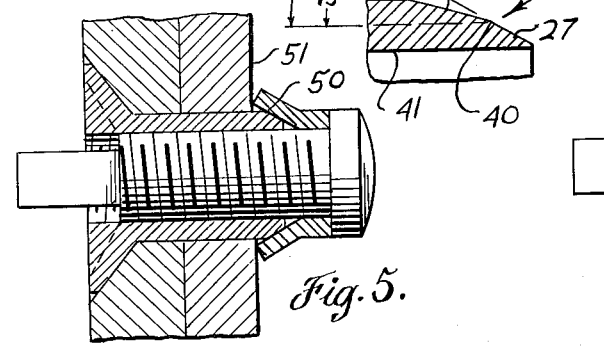
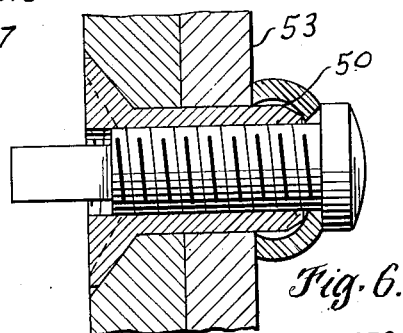

3,262,353
BLIND FASTENER
Ronald Waeltz, Hatboro, and Richard A. Walker, Philadelphia, Pa., assignors to Standard Pressed Steel Co., Jenkintown, Pa., a corporation of Pennsylvania
Filed Dec. 20, 1963, Ser. No. 332,052
3 Claims. (Cl. 85—72)

This invention relates to fasteners, and more particularly to the so-called blind fasteners; i.e., those which are used to secure an assembly of plates or other members together wherein access can only be had to one side of the assembly.

Blind fasteners of the type herein referred to are extremely useful to secure plates, sheets, or other structural members together, in areas of restricted access where it is inconvenient or impossible to apply a tool to both sides of the work pieces to be secured by the fastener. In accordance with the prior art teachings, one type of blind fastener is a three element assembly including a core bolt, an expandable collar of uniform cross section and a sleeve nut having a head and a tapered shank at the opposite extremity. The core bolt extends through the sleeve nut and carries the collar on the portion which projects through the tapered shank. Because the maximum diameters of the collar and the end of the core bolt which projects beyond the tapered shank are not greater than the sleeve diameter, the assembly can be inserted through registering openings in the members or work pieces to be fastened together. The nut head will then bear against the surface of the accessible face of the workpiece. The fastener assembly is provided with means to impart relative axial movement to the sleeve nut and core bolt whereby the collar is drawn over the tapered sleeve, expanded against the abutting surface of the inner memebr and held in place by the core bolt so as to form a second clamping or bearing surface opposed to the bearing surface provided by the nut head.

While generally satisfactory results have been obtained with these fasteners, they have not been as reliable as is desirable under conditions of very high stress. It has been found that failure generally occurs because when a collar of uniform cross section is forced over the co-operating tapered sleeve, the forward part of the collar, after it has passed over the taper, continues to move in the same outwardly diverging path until the hoop stresses developed in the collar overcome the effect of the taper, at which point the collar will start to return to its original shape. Depending on the relative distance between the blind face of the work piece and the base of the angle of the taper, the collar will either tend to flare out at the base or belly out in the middle. Thus, if the base of the taper 50 is very close to the face of the work piece 51 (FIG. 5), the collar will flare; and if the base of the taper 50 is generally away from the face of the work piece 53 (FIG. 6), the collar will belly or buckle. Once buckling or flaring begins, a very small amount of applied external load causes collapse of the collar and complete failure. Further, since these fasteners are installed in inaccessible locations, inspection is difficult, if not impossible. Therefore, potential sources of failure are generally not detected.

Accordingly, it is an object of this invention to improve the reliability and load-carrying capacity of these prior art blind fasteners.

It is a further object of this invention to prevent buckling and flaring of the clamping collar in a blind fastener.

A still further object is to provide means giving an indication that the improved fastener of this invention is properly installed and pre-loaded.

In accordance with this invention, these and other objects are achieved by a three piece blind fastener of the type which consists of a headed core bolt, a sleeve nut having a head providing a first clamping surface, and a collar adapted to be drawn over the sleeve by the core bolt and expanded to form a second clamping surface. The following unique features contribute to the increased clamping force and reliability which is achieved by the invention: The core bolt is provided with a head which joints the body at an acute angle to form an undercut driving shoulder, and with a straight unthreaded body section adjacent the head. The intermediate body portion of the core bolt is threaded and the end opposite the head has flats or driving surfaces whose maximum cross sectional dimension is no greater than the minor diameter of the core bolt threads. The major diameter of the core bolt threads is slightly less than the diameter of the body section. The head of the sleeve nut is provided with driving surfaces and the sleeve nut shank terminates in a tapered tip end section of reduced external diameter relative to the shank diameter. The tapered section reduces the external diameter of the shank in a plurality of stages with the angle of the outermost stage being less acute than the angle of the innermost stage. In addition, the sleeve nut is provided with an axial bore extending through the sleeve nut. The bore is provided with internal threads which are adapted to receive the threads of the core bolt. A portion of the bore extending from the tapered end to a point within the sleeve is provided with a counterbore of a length and diameter which will permit the unthreaded core bolt body section to be received therein without interference and which will support the tapered section during drawing down and seating of the collar.

Moreover, the collar has a stepped axial bore which extends from end to end, the internal diameter of the collar bore at one end being such as to provide a close toleranced fit for the core bolt body and the internal diameter of the collar bore at the other end and in the barrel portion intermediate the collar ends being counterbored to a diameter slightly greater than the external diameter of the outermost portion of the tapered tip of the sleeve nut shank. The collar wall thickness in the barrel is thinner than the wall thickness at either end, this reduction in thickness being effected by reducing the external collar diameter in the barrel portion. The end of the collar opposite the counterbored end of the sleeve is coned at an angle which is complementary to the acute angle at which the core bolt head joins the body. To facilitate installation and use as a blind fastener, the maximum external diameter of the core bolt head, the collar and the shank of the sleeve nut are substantially the same. In addition, the core bolt can be provided with a breakneck which is aligned with the head of the core bolt when the joint is properly loaded, and if desired, the portion of the threads of the sleeve nut can be distorted to a non-circular configuration so as to provide a prevailing torque type locking feature.

How the foregoing and other objects and advantages of the invention are achieved will be clear from the description which follows and from the accompanying drawings in which:

FIGURES 1 and 1a are side and end views of a core bolt formed in accordance with this invention;

FIGURES 2 and 2a are side and end views respectively disclosing one form of threaded sleeve nut;

FIGURE 2b is a detail view showing a portion of the tapered tip of the headed sleeve nut;

FIGURES 3 and 3a are side and end views showing a collar formed in accordance with the present invention;

FIGURE 4 shows an assembled fastener installed in a work piece just prior to the application of torquing force to the core bolt;

FIGURE 4a shows the fastener of FIGURE 4 after torquing forces have been applied; and FIGURES 5 and 6 show flared and buckled fasteners respectively.

Referring now to the illustrative embodiment shown in the drawings, FIGURE 1 shows a core bolt 10, used in carrying out the present invention. The core bolt 10 is provided with a plurality of wrenching surfaces 11 adjacent one end. While other means for applying a wrenching force may be employed, we prefer to use a hexagonal configuration which is adapted to fit standard tools.

The core bolt 10 is provided with a threaded mid-portion 13. The bolt shank adjacent the head is unthreaded as shown at 14. The diameter of the unthreaded shank portion should be slightly greater than the major diameter of the thread for reasons which will appear more fully hereinafter.

The core bolt head 15 joins the unthreaded portion 14 of the bolt shank at an angle which is slightly acute with respect to the bolt axis, thereby forming a recess or undercut shoulder 16. If desired, the bolt head may be provided with a conventional wrenching surface such as a Phillips recess, not shown, to facilitate later disassembly of the fastener. A portion of the bolt shank is cut away to form a breakneck 17.

The sleeve nut 20 shown in FIGURE 2 has a bored portion 21 which is provided with threads 22 adjacent the head end for cooperation with the core bolt threads. If a prevailing torque type locking feature is desired, some of the threads 22' can be distorted to a non-circular configuration. At the tapered end, the sleeve is provided with a slight counterbore 23 which is dimensioned to provide a closely toleranced but interference-free fit with the unthreaded portion 14 of the core bolt 10. The sleeve nut has a head 24 of conventional construction, which may assume the form shown in FIG. 1 for flush installation—other head types and configurations can, of course, be employed. The head is provided with tool-engaging portions such as recesses 25, shown in FIGURE 2a, to prevent relative movement of the nut when torquing forces are applied to the wrenching surface of the core bolt.

The end opposite the headed end of the sleeve nut 20 is provided with a tapered section 26. As best shown in FIGURE 2b, the tapered section consists of a plurality of distinct stages 27 and 28. The angle of the outermost stage 27 to the sleeve axis is greater than the angle of the succeeding stage 28 for reasons which will appear more clearly hereinafter.

The collar 30 shown in FIGURE 3 is provided with a beveled end 31 so that when assembled on the bolt, the collar end conforms to the undercut driving surface 16 of the core bolt head. To facilitate axially aligning the sleeve nut, core bolt and collar, the inner diameter of the outer end 32 of the collar is dimensioned to provide a closely toleranced fit with the shank 14 of the core bolt and the leading or inner end of the collar is provided with a counterbored portion 33 which has a diameter slightly greater than the initial portion of the tapered tip 27 of the sleeve nut 20. The intermediate portion 34 of the collar has a slightly reduced wall thickness formed by removing some of the material from the outer surface of the collar. The collar wall thickness differential between the leading end 35 and the mid-portion 34 is a feature which, in cooperation with the compound angle taper 27, 28, causes the collar to flow evenly over and maintain a tight fit with the tapered sleeve as will be pointed out hereinafter.

In use, the core bolt, the collar and sleeve nut are assembled, as shown in FIGURE 4, with the core bolt drawn up so that the collar is loosely seated and axially centered between the core bolt head and the sleeve nut tip. The assembly is then inserted into the aligned openings in the members 36, 37 which are to be fastened together. Relative torquing force is applied by a conventional driving tool to the driving surfaces 11 and 25 to rotate the core bolt with respect to the nut and move it axially relative to the sleeve nut thereby causing the driving head 15 to force the collar 20 over the tapered portion 26 of the sleeve and form a head or clamping surface 38 on the blind side of the joint. The loading of the fastener is controlled by the torque needed to shear off the tail of the core bolt at the breakneck 17 and for any given bolt material can be varied in a known manner by changing the cross sectional area of the breakneck. When the fastener is properly preloaded, the breakneck portion of the core bolt is aligned with, or slightly below the surface of the sleeve nut head. Thus, an inspector can readily determine whether the joint is properly preloaded.

The compound angle of the tapered end 26 of the sleeve, the length relation of the angles and the collar dimensions cooperate to cause the collar to be drawn evenly over the sleeve without buckling or flaring and while maintaining a tight fit between the sleeve and collar. The counterbored portion 33 of the collar fits over the tip of the outermost stage 27 of the tapered sleeve as shown in FIGURE 4. In addition to centering the collar, this arrangement serves to promote uniform deformation and to minimize the initial force that must be applied to expand the collar. Moreover, because the initially expanded leading end portion 35 has a greater cross section than the collar portions which follow, hoop stresses will be developed in the leading end as it moves up the inclined surface 27 more readily than in the thinner trailing portions. As the collar moves onto the more gradually inclined surface 28, these hoop forces cause the leading end to maintain itself in engagement with the sleeve surface 28 rather than to continue to flare in the direction of the first stage. As the collar is advanced further, the slightly less thick center portion will follow the thicker-walled portion and flow evenly over the tapered sleeve until the collar is seated.

One important factor which influences the load carrying capacity on the blind side of the core bolt pull-down-type fastener is the relationship of the height of the collar to the wall thickness. The load carrying capacity of such fasteners will vary inversely with the ratio of the collar height to the collar thickness; the smaller the ratio, the greater the load that can be carried and vice versa.

The angularity of the sleeve tip is another factor that can influence prevention of bellying and flaring of the collar. With collars having a minimum wall thickness adapted to support a specified load, we have found that the optimum angle on the sleeve for expanding the collar to form the bearing face is a taper of the order 15°. However, if a 15° angle is used to force full radial expansion of the collar, the extent of pull-down and the collar height will necessarily be excessive for the wall thickness involved and maximum loads cannot be carried thereby because of colum effects. In order to minimize the extent of pull-down and to permit the use of a shorter collar height, the collar should be forced to expand over a sleeve having a compound angle on the tapered end in which a blunter angle, preferably about a 30° angle is used in the first stage of the taper. In this way, the collar is made to expand more rapidly in the initial pull-down stage and thereafter the hoop stresses will cause the collar to contract and to be drawn evenly over the more acutely angled second stage until seated. Therefore, a shorter overall collar height can be employed.

In the illustrative embodiment and as shown in FIGURE 2b, the two angles of the taper intersect at a point 40 about midway between the inner and outer sleeve walls 41 and 42.

In designing the collar, the combined length of the portions 34, 35 is preferably slightly greater than the length of the portion of sleeve 26 that projects beyond the blind bearing face 39 of the assembly to be fastened. Moreover, the thinner collar wall portion 34 should be about 85% of the thickness of the thicker wall portion 35. This is a factor which, when taken in conjunction with the compound taper 27, 28 will assure that the collar will flow evenly over the sleeve 26.

Further, in order to insure the forming of a better fitting collar in those portions adjacent the core bolt head 15 after pull-down, the collar thickness at the outer end 31 in the bore 32 should be the thickest portions of the collar.

Prevention of buckling or flaring of the collar 30 is achieved by a combination of the above described features. In addition, the mating angles on the undercut driving shoulder 16 of the core bolt and the coned surface 31 of the collar serve to maintain these two parts in alignment as the collar is forced over the tapered sleeve—thereby assuring proper distribution of the force and avoiding conditions of misalignment, a factor that can also contribute to buckling and flaring.

We claim:

1. A blind fastener including a core bolt, a headed sleeve nut and a collar adapted to be drawn over the sleeve by the core bolt and radially expanded to provide a second clamping surface, said core bolt having a head, a straight unthreaded body section adjacent the head, a threaded shank portion intermediate the body and an end portion having driving surfaces, the maximum cross sectional dimension of the end having the driving surfaces being no greater than the minor diameter of the core bolt threads and the major diameter of the core bolt threads being no greater than the diameter of the body, the core bolt head joining the body at an acute angle to form an undercut driving shoulder; the head of said sleeve nut being provided with driving surfaces and said sleeve nut having a shank terminating in a tapered tip end section of reduced external diameter relative to the shank diameter, an axial bore extending through the sleeve nut, said bore being provided internal threads adapted to receive the threads of the core bolt, the portion of the bore extending from the tapered end to a point within the sleeve being provided with a counter-bore of a length and diameter which will permit the unthreaded core bolt body section to be received therein without interference during the drawing down and seating of the collar, said end taper effecting the reduction of the external diameter of the shank in a plurality of stages, the included cone apex angle of the outermost stage being about 60° and the included cone apex angle of the innermost stage being about 30° and where the innermost and outermost cone angles intersect at a point about midway between the sleeve walls; said collar having a stepped axial bore extending from end to end, the internal diameter of the collar bore at one end being such as to provide a close toleranced fit for the core bolt body and the internal diameter of the collar bore at the other end and in the barrel portion intermediate the collar ends being counterbored to a diameter slightly greater than the external diameter of the outermost portions of the tapered tip of the sleeve nut shank, the collar wall thickness in the barrel being thinner than the wall thickness at either end, such reduction in wall thickness being effected by reducing the external collar diameter in the barrel portion by about 15%, the end of the collar opposite the counterbored end of the sleeve being coned at an angle complementary to the acute angle at which the core bolt head joins the body; and the maximum external diameters of the core bolt head, the collar and the shank of the sleeve nut being substantially the same.

2. A fastener according to claim 1 wherein the core bolt is provided with a breakneck in the threaded shank portion.

3. A fastener according to claim 1 wherein a portion of the threads of the sleeve nut are distorted to a non-circular configuration.

References Cited by the Examiner

UNITED STATES PATENTS

| 2,783,673 | 3/1957 | Lewis | 85—75 |
|---|---|---|---|
| 3,129,630 | 4/1964 | Wing et al. | 85—72 |

FOREIGN PATENTS

| 208,769 | 12/1955 | Australia. |
|---|---|---|
| 145,722 | 3/1958 | Australia. |

OTHER REFERENCES

Ser. No. 190,868, J. F. G. Chobert (A.P.C.), published June 15, 1943.

EDWARD C. ALLEN, *Primary Examiner.*